United States Patent [19]
Carter

[11] Patent Number: 5,816,622
[45] Date of Patent: Oct. 6, 1998

[54] PROTECTIVE SLEEVE FOR GARDEN HOSE

[75] Inventor: Steven D. Carter, Barrington, R.I.

[73] Assignee: Teknor Apex Company, Pawtucket, R.I.

[21] Appl. No.: 640,395

[22] Filed: Apr. 30, 1996

[51] Int. Cl.⁶ .............................. F16L 11/00; F16L 35/00
[52] U.S. Cl. .......................... 285/45; 285/115; 285/116; 138/110
[58] Field of Search .............................. 285/93, 114, 115, 285/116, 45; 138/109, 110; 403/41

[56] References Cited

U.S. PATENT DOCUMENTS

| | | | |
|---|---|---|---|
| 1,140,307 | 5/1915 | Hurley | 138/110 |
| 1,461,983 | 7/1923 | Parker . | |
| 1,778,576 | 10/1930 | Walker . | |
| 2,102,010 | 12/1937 | Kopp | 138/110 |
| 2,700,988 | 1/1955 | Smisko | 138/110 |
| 2,733,937 | 2/1956 | Mowrer, Jr. . | |
| 3,088,756 | 5/1963 | May | 285/116 |
| 3,730,564 | 5/1973 | Bachle et al. | 285/115 |
| 3,784,236 | 1/1974 | Stocum | 285/45 |
| 3,831,635 | 8/1974 | Burton | 138/110 |
| 3,964,115 | 6/1976 | Platek . | |
| 4,058,031 | 11/1977 | Magarian . | |
| 4,367,967 | 1/1983 | Albert, Jr. | 138/100 |
| 4,741,559 | 5/1988 | Berghman | 285/45 |
| 5,014,940 | 5/1991 | Sherman . | |
| 5,143,409 | 9/1992 | Lalikos | 285/115 |
| 5,286,068 | 2/1994 | Wiebe | 285/114 |
| 5,316,348 | 5/1994 | Franklin | 285/116 |
| 5,333,658 | 8/1994 | Folkman | 285/116 |
| 5,345,624 | 9/1994 | Brown, III . | |
| 5,367,925 | 11/1994 | Gasparre . | |
| 5,572,912 | 11/1996 | Gasparre . | |

FOREIGN PATENT DOCUMENTS

| | | | |
|---|---|---|---|
| 666072 | 7/1963 | Canada | 285/116 |
| 2605-918A | 5/1988 | France . | |
| 25 54 315 | 6/1996 | Germany . | |
| 597130 | 8/1959 | Italy | 285/116 |
| WO 84/04721 | 12/1984 | Italy . | |
| 18483 | 6/1903 | United Kingdom | 285/116 |

*Primary Examiner*—Eric K. Nicholson
*Attorney, Agent, or Firm*—Salter & Michaelson

[57] ABSTRACT

A protective sleeve for a garden hose includes a protective shell section having a generally tubular body with an inner bore shaped for receiving a coupling of the garden hose snugly therein. A flexible strain relief section is releasably attached to the shell section wherein the flexible strain relief section has a generally tubular body. A locking member of the strain relief section releasably attaches the strain relief section to the shell section. The locking member is receivable within an opening formed in the body of the shell section. The locking member is resiliently movable from a relaxed position in which it extends through the opening and engages the body of the shell section for preventing axial movement of the strain relief section away from the shell section, to an inwardly flexed position in which the locking member flexes inwardly out of the opening and disengages the body of the shell section for allowing relative axial movement between the shell and strain relief sections. The strain relief section has an outer surface that defines a gripping surface for facilitating the attachment of the garden hose with another garden hose.

13 Claims, 3 Drawing Sheets

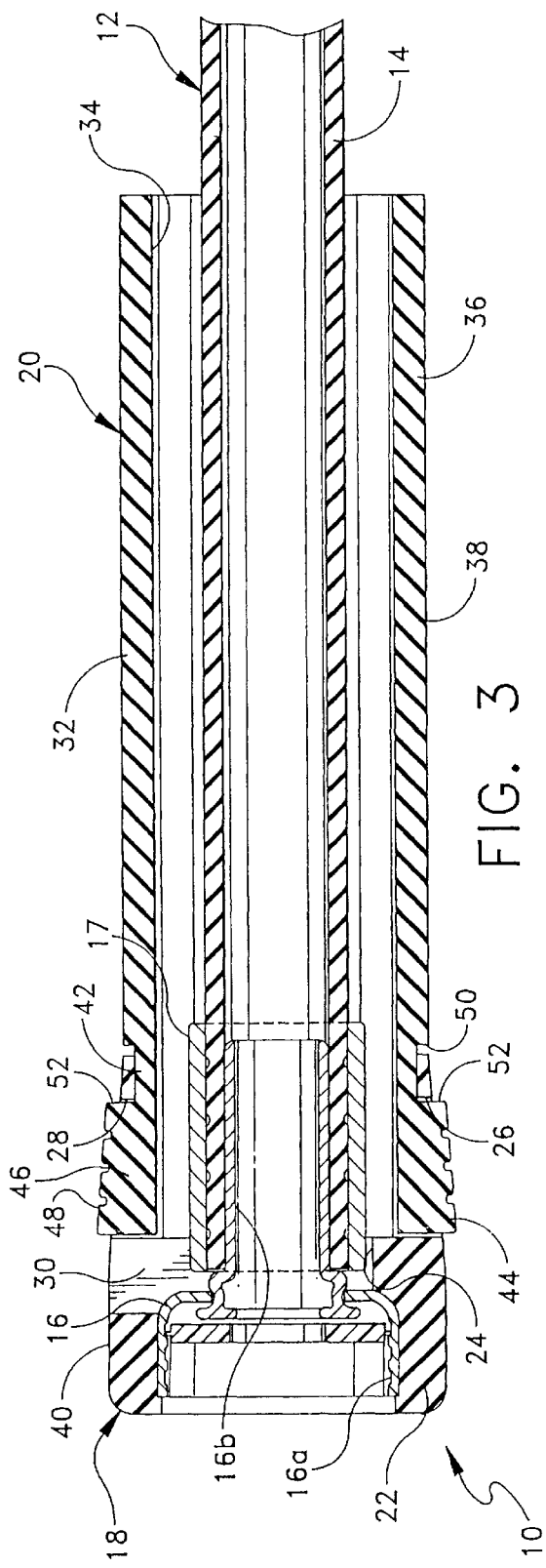
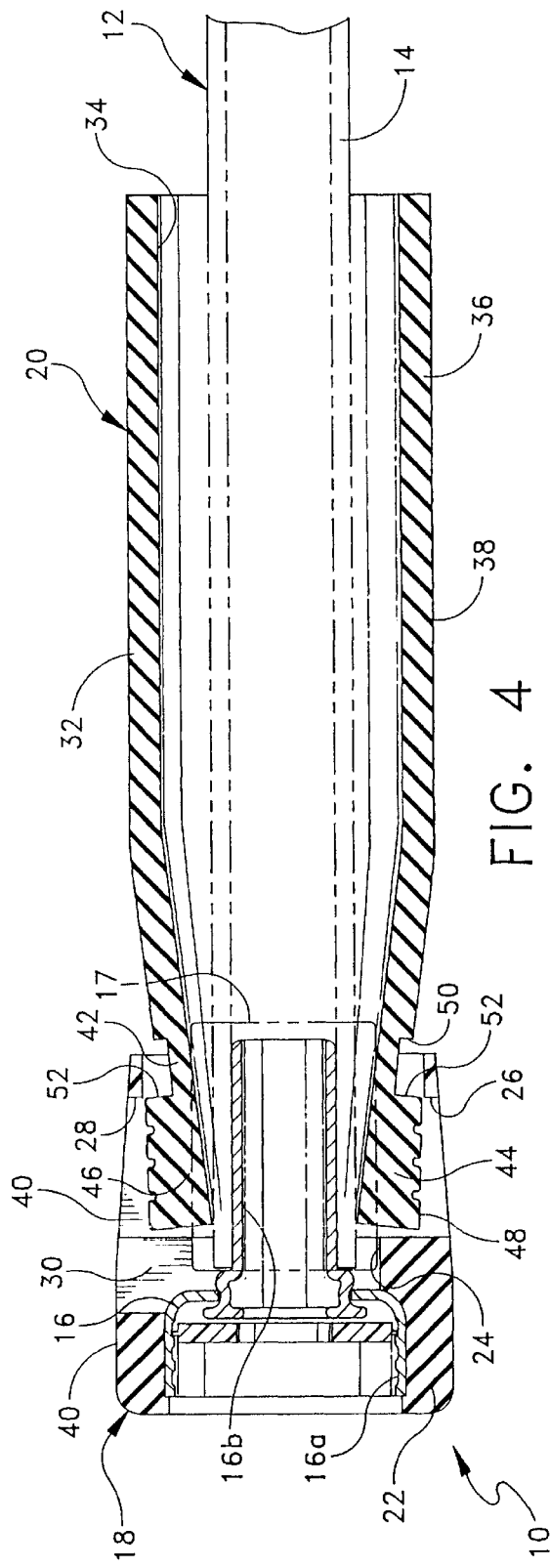

PROTECTIVE SLEEVE FOR GARDEN HOSE

BACKGROUND AND SUMMARY OF THE INVENTION

This invention is in the same general field as devices for protecting the female connector or coupling, usually made from brass or plastic, of a garden hose from being crushed or otherwise damaged during use. It also relates to those devices which provide a strain relief to the hose adjacent to its connection with the connector for preventing crimping or other damage to the hose.

One such device is illustrated in U.S. Pat. No. 4,805,933 to Swisher which discloses a one-piece sleeve that is disposed over the end of the hose having the female connector. Since the sleeve is fabricated from elastomeric material, it functions to provide a strain relief to the hose at its connection with the female connector. However, damage can occur to the female connector since elastomeric material is not rigid and therefor cannot withstand substantial forces or impacts applied to the connector. Thus, while being adequate for relieving strain from the hose, Swisher's sleeve is somewhat inadequate for protecting the relatively fragile female connector which, as stated above, is typically fabricated from brass or plastic.

U.S. Pat. No. 5,181,750 to Reum discloses a garden hose having a male coupling that consists of a threaded insert member, a collar and a strain relief device, and a female coupling that consists of a threaded receiver and a strain relief device. One drawback to Reum's arrangement is that the threaded insert member and receiver of the couplings are completely separate from their respective strain relief devices. Also, it is relatively complicated in construction and expensive to manufacture.

The present invention is directed to an improved protective sleeve for a garden hose having a coupling and a rubber hose attached to the coupling. The protective sleeve comprises a protective shell section having a generally tubular body with an inner bore shaped for receiving the coupling of the garden hose snugly therein. The shell section is designed to protect the coupling from being deformed when subjected to crushing forces applied thereto. A flexible strain relief section is releasably attached to the shell section wherein the flexible strain relief section has a generally tubular body.

Means is provided for releasably attaching the strain relief section to the shell section prior to the attachment of the hose to the coupling. The attaching means comprises at least one locking member formed on the body of the strain relief section which is receivable within an opening formed in the body of the shell section. The locking member is resiliently movable from a relaxed position in which it extends through the opening and engages the body of the shell section for preventing axial movement of the strain relief section away from the shell section when the shell and strain relief sections are in an attached position, to an inwardly flexed position in which the locking member flexes inwardly out of the opening and disengages the body of the shell section for allowing relative axial movement between the shell and strain relief sections.

In another aspect of the present invention the protective sleeve comprises a protective shell section having a generally tubular body with an inner bore shaped for receiving the coupling of the garden hose snugly therein, and a flexible strain relief section releasably attached to the shell section. In this aspect of the invention, the strain relief section has a generally tubular body with a polygonal-shaped outer surface defining a gripping surface which is adapted to facilitate the attachment of the garden hose with a mating coupling of another garden hose.

Accordingly, among the several objects of the present invention are the provision of a protective sleeve for a garden hose having a protective shell section that protects the female connector or coupling upon which it is attached; the provision of such a sleeve having a flexible strain relief section releasably attached to the shell section which provides a strain relief to the garden hose at its point of attachment with the connector; the provision of such a sleeve having an outer gripping surface which facilitates easy connection of the garden hose with another garden hose; the provision of such a sleeve having a viewing aperture for viewing the connection of the garden hose with the female connector; and the provision of such a sleeve which is durable in construction, easy to assembly and cost-efficient to manufacture.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 3 is a cross-sectional view taken along line 3—3 of FIG. 1;

FIG. 4 is a cross-sectional view similar to FIG. 3 illustrating a locking member of the strain relief section being forced in an inward direction and the hose and a ferrule for attaching the hose to a stem of the coupling in broken lines;

Corresponding reference numerals designate corresponding parts throughout the several views of the drawings.

DETAILED DESCRIPTION OF THE PREFERRED EMBODIMENTS

Figure 1:
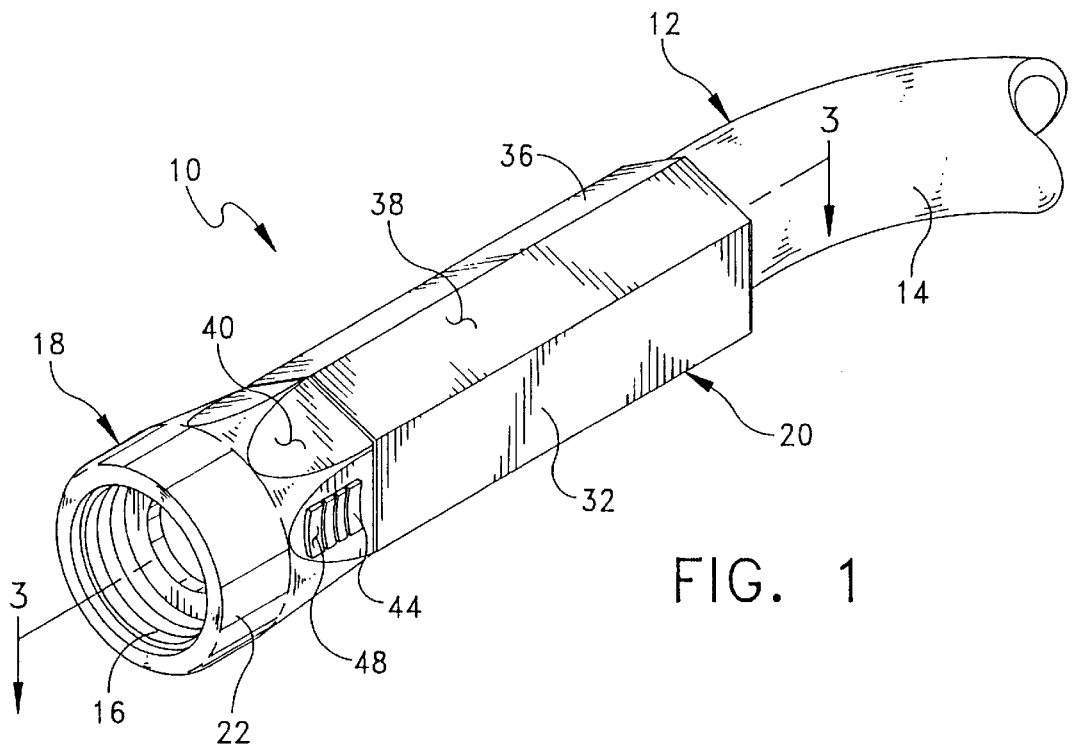
FIG. 1 is a perspective view of a protective sleeve for a garden hose of the present invention, a strain relief section of the sleeve being illustrated in an attached position with respect to a shell section thereof.
Figure 2:
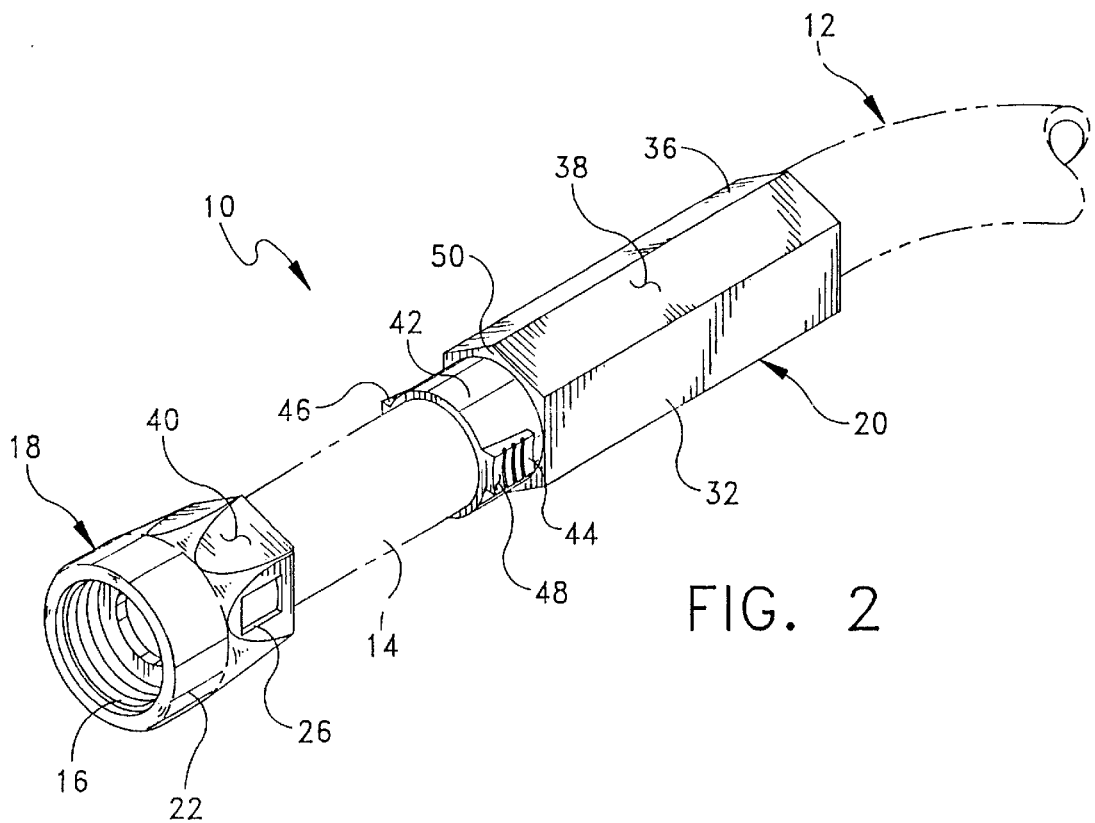
FIG. 2 is a perspective view of the protective sleeve illustrating the strain relief section in a detached position with respect to the shell section and the garden hose in broken lines.

Referring now to the drawings, and more particularly to FIGS. 1–3, there is generally indicated at 10 a protective sleeve for a garden hose, generally indicated at 12. The garden hose 12 is constructed in the usual manner to have a rubber or synthetic rubber hose 14 and a brass or plastic female coupling 16 attached to an open end of the hose 14 to form a water-tight seal. The garden hose 12 upon which the protective sleeve 10 is applied is of the type which is well-known in the art. The protective sleeve 10 is designed to protect the somewhat fragile brass or plastic female receiver portion 16a of the coupling 16 from being crushed or otherwise damaged, and to provide a strain relief to the hose 14 adjacent its connection with the coupling 16. As shown, the receiver portion 16a is cylindrically-shaped; however, it can be fabricated in any shape, such as polygonally-shaped.

More specifically, as best shown in FIG. 3, the garden hose 12 is of two piece construction, the hose 14 being sealably attached to a stem portion 16b of the coupling 16 by a brass ferrule 17. It should be noted that the manner by which the hose 14 is attached to the stem portion 16b of the coupling 16 is well-known in the art of garden hoses. Typically, after the end of the hose 14 having the ferrule 17 is slipped over the stem portion 16b so that the end of the hose abuts the receiver portion 16a, a device is inserted into the stem portion for expanding it, thereby sandwiching the hose 14 between stem portion and the ferrule for locking the hose to the coupling 16.

As illustrated in FIGS. 1 and 2, the protective sleeve 10 is of two-part construction, and comprises a protective rigid shell section, generally indicated at 18, and a flexible strain relief section, generally indicated at 20, which is releasably attached to the shell section 18. Turning now to FIGS. 3 and 4, the shell section 18 has a generally tubular body 22 with an inner bore 24 formed therein. A portion of the bore 24 is shaped for receiving the receiver portion 16a of the brass or plastic coupling 16 snugly therein. Preferably, the shell section 18 is fabricated from a suitable hard polymer, and is attached to the coupling 16 by pressure or sonic welding. The shell section 18 is rigid enough to protect the coupling 16 from being deformed when it is subjected to crushing forces.

Figure 5:
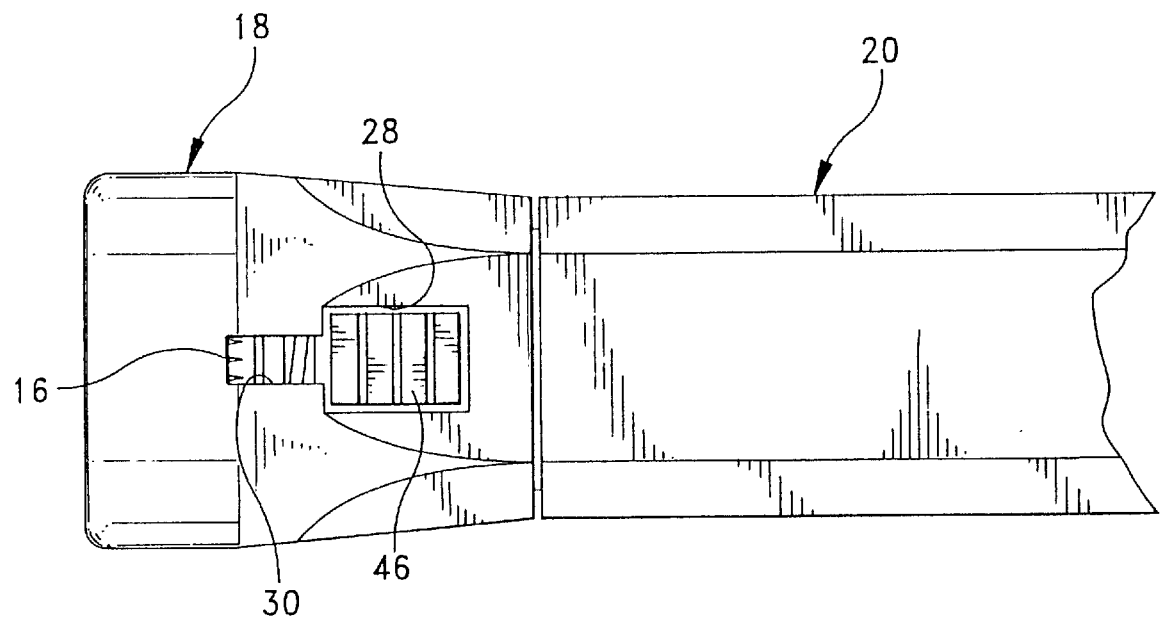
FIG. 5 is an elevational view of the sleeve in its attached position.

Referring still to FIGS. 3 and 4, and to FIG. 5, the shell section 18 has formed therein a pair of oppositely positioned, rectangularly-shaped, first and second openings 26, 28, with one of the openings, opening 28, being elongated at 30 to define a viewing aperture, the viewing aperture being narrower than the opening 28 for viewing the connection between the coupling 16 and the rubber hose 14. The purpose of the first and second openings 26, 28 will become apparent as the description of the protective sleeve 10 continues.

The strain relief section 20 also has tubular body 32, which is longer in length than the body 22 of the shell section 18, and a bore 34 formed therein along its length. Unlike the body 22 of the shell section 18, however, the body 32 of the strain relief section 20 is fabricated from flexible, pliant plastic material which is capable of bending when the hose 14 bends. As shown in FIGS. 2–4, the body 32 of the strain relief section 20 includes a main body portion 36 having a polygonal-shaped, e.g., a hexagonal-shaped, outer surface 38 that defines a gripping surface adapted to facilitate the attachment of the garden hose 12 with another garden hose of similar construction. As illustrated in FIG. 1, the shell section 18 also has a tapered, polygonal-shaped outer surface 40 which is aligned with the outer surface 38 of the strain relief section 20 for further facilitating the attachment of the garden hose 12 with another garden hose and for enhancing its appearance.

The strain relief section 20 also includes a reduced-diameter neck portion 42 having means formed therein for releasably attaching the strain relief section 20 to the shell section 18. More specifically, the neck portion 42 of the strain relief section 20 comprises a pair of locking members 44, 46 integrally formed on the neck portion 42. Each locking member 44, 46 extends radially outwardly from the neck portion 42 and includes an outer gripping surface 48 having notches (not designated) formed therein for enabling a person connecting the strain relief section 20 to the shell section 18 to better grip the strain relief section. Between the main body portion 36 and neck portion 42, there is a shoulder portion 50 which abuts the end of the shell section body 22 when the shell and strain relief sections 18, 20 are assembled. As illustrated in FIG. 1, this gives the protective sleeve 10 of the present invention the illusion of being a one-piece unit having a nice, clean look.

Both of the locking members 44, 46 are resiliently movable from a relaxed position (see FIG. 3) in which they engage the body 22 of the shell section 18 and extend through their respective opening 26, 28 provided therein for preventing axial movement of the strain relief section 20 away from the shell section 18 when the two sections are connected to one another, to an inwardly flexed position (see FIG. 4) in which the locking members are flexed inwardly so that they disengage the body 22 of the shell section 18 for allowing relative axial movement of between the two sections 18, 20.

Each locking member 44, 46 has a shoulder 52 which engages the body 22 of the shell section 18 for maintaining the strain relief section 20 in a locked position with respect to the shell section. When flexing the locking members 44, 46 inwardly, the shoulders 52 of the locking members clear the openings 26, 28 of the shell section 18 thereby enabling the strain relief section 20 to be moved axially away from the shell section 18. It should be noted that in order to disassemble the strain relief section 20 and the shell section 18, both of the locking members 44, 46 must be flexed inwardly so as to disengage the body 22 of the shell section 18. This can be accomplished by applying an inward force on the surfaces 48 locking members 44, 46 with a person's thumb and forefinger.

To attach the strain relief section 20 to the shell section 18, pressure is applied on the surfaces 48 of the locking members 44, 46 to force them radially inwardly. The neck portion 42 of the strain relief section 20 (having the locking members 44, 46) is then fit into the open end of the bore 24 of the shell section 18. It should be noted that the outer diameter of the neck portion 42 of the strain relief section 20 is slightly less than the inner diameter of the bore, 24 of the shell section 18 (see FIGS. 3 and 4). Once the reduced neck portion 42 is inserted into the bore 24 of the shell section 18, the strain relief section 20 is then forced into the shell section 18 until the shoulder portion 50 of the strain relief section 20 engages the end of the body 22 of the shell section 18. The strain relief section 20 can then be rotated so that the locking members 44, 46 are aligned with their respective openings 26, 28, whereupon the locking members 44, 46 extend therethrough in the manner illustrated in FIG. 3 for securing the strain relief section 20 to the shell section 18.

To disassemble the shell and strain relief sections 18, 20, pressure is exerted on the surfaces 48 of the locking members 44, 46 so as to flex them inwardly in the manner illustrated in FIG. 4. Once the shoulders 52 of the locking members 44, 46 clear the body 22 of the shell section 18 (i.e., when the locking members 44, 46 are withdrawn from their respective openings 26, 28), an axial force is then applied to the strain relief section 20 in a direction away from the shell section 18 so as to pull the neck portion 42 out of the bore 24 of the shell section. This motion completes the disassembly of the two sections 18, 20.

Once assembled, the protective sleeve 10 is ready to receive the hose 14 and ferrule 17 for attaching the hose to the coupling 16. As mentioned above, the hose 14 and ferrule 17 are slipped over the stem portion 16b until the ends of the hose and. ferrule are abutting the receiver portion 16a. The viewing aperture 30 enables a person to visually inspect this movement. Once inserted, the instrument is inserted into the stem portion 16b for expanding the stem portion to lock the garden hose 14 to the coupling 16. Once attached, the strain relief section 20 cannot be removed from the shell section 18 due to the lack of space between the strain relief section and the ferrule 17. Thus, the strain relief section 20 is permanently attached to the shell section 18 after the hose 14 is mounted on the coupling 16.

Figure 6:
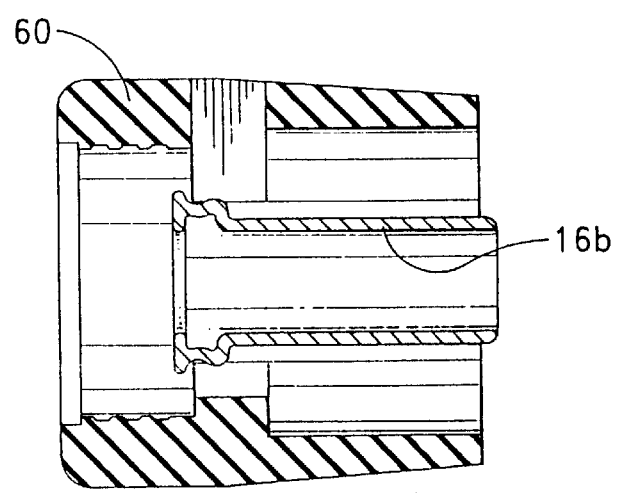
FIG. 6 is a cross-sectional view of a shell section of another preferred embodiment.

FIG. 6 illustrates a shell section 60 that is constructed similarly to shell section 18 except that the shell section 60 is of one-piece construction. More specifically, the shell section 60 is fabricated from rigid plastic wherein the internal threads are formed therein thereby eliminating the need of having a brass coupling disposed therein. This reduces the amount of parts necessary to fabricated the protective sleeve 10 along with the attendent parts and labor costs. It should also be mentioned that the outer surface of the sleeve can take on any shape. The purpose of this construction would be to protect the male coupling of another garden hose that is threaded into the shell section 60.

Thus, it should be observed that the protective sleeve 10 of the present invention is capable of both protecting the coupling 16 on which the shell section 18 is mounted and functioning as a strain relief 20 for protecting the hose 14 and its connection with the coupling 16. The fact that the protective sleeve 10 is of two piece construction enables a more rigid material to be used for the shell section 18, and a more flexible, pliant material to be used for the strain relief section 20.

Furthermore, the strain relief section 20 has an outer surface 38 which enables a person to easily grip and tighten the garden hose on which the protective sleeve 10 is applied with the male coupling of another garden hose. More specifically, since the strain relief section 20 is locked in place with respect to the shell section 18 by the locking members 44, 46, by turning or rotating the strain relief section 20, corresponding motion is transferred to the shell section 18. Moreover, the viewing aperture 30 provided in the body 22 of the shell section 18 (see FIG. 5) allows for the visual inspection of the connection of the hose 14 and coupling 16. Thus, the protective sleeve 10 provides a significant advantage over the prior art sleeves discussed above.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A protective sleeve for a garden hose having a coupling and a rubber hose attached to the coupling. said sleeve comprising:
    a protective shell section fabricated from rigid material, said shell section having a generally tubular body with an inner bore shaped for receiving the coupling of the garden hose snugly therein, the shell section protecting the coupling from being deformed when subjected to crushing forces applied thereto; and
    a flexible strain relief section releasably attached to the shell section, said flexible strain relief section having a generally tubular body; and
    means for releasably attaching the strain relief section to the shell section comprising at least one locking member formed on the body of the strain relief section which is receivable within an opening formed in the body of the shell section, the locking member being resiliently movable from a relaxed position in which it extends through the opening and engages the body of the shell section for preventing axial movement of the strain relief section away from the shell section when the shell and strain relief sections are in an attached position, to an inwardly flexed position in which the locking member flexes inwardly out of the opening and disengages the body of the shell section for allowing relative axial movement between the shell and strain relief sections.

2. A protective sleeve as set forth in claim 1, said attaching means further comprising a second locking member formed on the body of the strain relief section which is receivable within a second opening formed in the shell section, said second locking member also being movable between a relaxed position and a flexed position.

3. A protective sleeve as set forth in claim 2 said locking members being oppositely positioned with respect to one another.

4. A protective sleeve for a garden hose having a coupling and a rubber hose attached to the coupling, said sleeve comprising:
    a protective shell section fabricated from rigid material, said shell section having a generally tubular body with an inner bore shaped for receiving the coupling of the garden hose snugly therein, the shell section protecting the coupling from being deformed when subjected to crushing forces applied thereto, said body of the shell section having a viewing aperture formed therein for viewing the hose attached to the coupling; and
    a flexible strain relief section releasably attached to the shell section, said flexible strain relief section having a Generally tubular body.

5. A protective sleeve as set forth in claim 4 said viewing aperture opening into the opening for receiving the locking member.

6. A protective sleeve for a garden hose having a coupling and a rubber hose attached to the coupling, said sleeve comprising:
    a protective shell section having a generally tubular body with an inner bore shaped for receiving the coupling of the garden hose snugly therein, the shell section completely surrounding the coupling for protecting the coupling from being deformed when subjected to crushing forces applied thereto;
    a flexible strain relief section releasably attached to the shell section, said strain relief section having a generally tubular body with a polygonal-shaped outer surface defining a gripping surface which is adapted to facilitate the attachment of the garden hose with a mating coupling of another garden hose; and
    means for releasably attaching the strain relief section to the shell section.

7. A protective sleeve for a garden hose having a coupling and a rubber hose attached to the coupling, said sleeve comprising: a protective shell section having a generally tubular body with an inner bore shaped for receiving the coupling of the garden hose snugly therein, the shell section protecting the coupling from being deformed when subjected to crushing forces applied thereto;
    a flexible strain relief section releasably attached to the shell section, said strain relief section having a generally tubular body with a polygonal-shaped outer surface defining a gripping surface which is adapted to facilitate the attachment of the garden hose with a mating coupling of another garden hose; and
    means for releasably attaching the strain relief section to the shell section, said attaching means comprising at least one locking member formed on the body of the strain relief section which is receivable within an opening formed in the body of the shell section, the locking member being resiliently movable from a relaxed position in which it extends through the opening and engages the body of the shell section for preventing axial movement of the strain relief section away from the shell section when the shell and strain relief sections are in an attached position, to an inwardly flexed position in which the locking member flexes out of the opening and disengages the body of the shell section for allowing relative axial movement between the shell and strain relief sections.

8. A protective sleeve as set forth in claim 7, said attaching means further comprising a second locking member formed on the body of the strain relief section which is receivable within a second opening formed in the body of the shell section, said second locking member also being movable between a relaxed position and a flexed position.

9. A protective sleeve as set forth in claim 8, said locking members being oppositely positioned with respect to one another.

10. A protective sleeve as set forth in claim 7, said shell section having a viewing aperture formed therein for viewing the connection between the coupling and the rubber hose attached to the coupling.

11. A protective sleeve as set forth in claim 10, said viewing aperture opening into the opening for receiving the locking member.

12. A protective sleeve for a garden hose comprising:

a protective shell section fabricated from rigid material, said shell section having a generally tubular body with an inner bore having threads formed therein, the shell section being fabricated from rigid material for protecting the coupling of another garden hose threadably connected thereto;

a flexible strain relief section releasably attached to the shell section, said flexible strain relief section having a generally tubular body; and means for releasably attaching the strain relief section to the shell section comprising at least one locking member formed on the body of the strain relief section which is receivable within an opening formed in the body of the shell section, the locking member being resiliently movable from a relaxed position in which it extends through the opening and engages the body of the shell section for preventing axial movement of the strain relief section away from the shell section when the shell and strain relief sections are in an attached position, to an inwardly flexed position in which the locking member flexes inwardly out of the opening and disengages the body of the shell section for allowing relative axial movement between the shell and strain relief sections.

13. A protective sleeve as set forth in claim 12, said attaching means further comprising a second locking member formed on the body of the strain relief section which is receivable within a second opening formed in the shell section, said second locking member also being movable between a relaxed position and a flexed position.

* * * * *